US 8,666,796 B2

(12) United States Patent
Balseiro et al.

(10) Patent No.: US 8,666,796 B2
(45) Date of Patent: Mar. 4, 2014

(54) CONTENT ITEM ALLOCATION

(75) Inventors: Santiago R. Balseiro, New York, NY (US); Jon Feldman, New York, NY (US); Seyed Vahab Mirrokni Banadaki, New York, NY (US); Shanmugavelayutham Muthukrishnan, New York, NY (US)

(73) Assignee: Google Inc., Mountain View, CA (US)

( * ) Notice: Subject to any disclaimer, the term of this patent is extended or adjusted under 35 U.S.C. 154(b) by 37 days.

(21) Appl. No.: 13/365,630

(22) Filed: Feb. 3, 2012

(65) Prior Publication Data

US 2012/0203627 A1 Aug. 9, 2012

Related U.S. Application Data

(60) Provisional application No. 61/439,469, filed on Feb. 4, 2011.

(51) Int. Cl.
*G06Q 10/00* (2012.01)

(52) U.S. Cl.
USPC ...................................................... 705/7.23

(58) Field of Classification Search
USPC ...................................................... 705/7.29
See application file for complete search history.

(56) References Cited

U.S. PATENT DOCUMENTS

| | | | |
|---|---|---|---|
| 8,060,388 B1 * | 11/2011 | Huberman et al. | 705/5 |
| 8,170,913 B1 | 5/2012 | Baluja | |
| 8,423,407 B2 * | 4/2013 | Schepers et al. | 705/14.43 |
| 8,478,644 B1 * | 7/2013 | Baluja | 705/14.43 |
| 2002/0055865 A1 * | 5/2002 | Hammann | 705/7 |
| 2003/0225593 A1 * | 12/2003 | Ternoey et al. | 705/1 |
| 2006/0173743 A1 | 8/2006 | Bollay | |
| 2007/0150353 A1 | 6/2007 | Krassner et al. | |
| 2008/0243601 A1 | 10/2008 | Patel et al. | |
| 2009/0106055 A1 * | 4/2009 | Demczuk et al. | 705/5 |
| 2012/0010901 A1 * | 1/2012 | Johnson et al. | 705/2 |
| 2012/0158461 A1 * | 6/2012 | Aldrey et al. | 705/7.35 |
| 2012/0203627 A1 * | 8/2012 | Balseiro et al. | 705/14.46 |

FOREIGN PATENT DOCUMENTS

WO  WO2010088479 A2  8/2010

OTHER PUBLICATIONS

Notification of Transmittal of the International Search Report and the Written Opinion of the International Search Authority, or the Declaration ; Aug. 24, 2012; World Intellectual Property Organization (WIPO) (International Bureau of); PCT/US2012/023809 ; 8 pages.

* cited by examiner

*Primary Examiner* — Romain Jeanty
(74) *Attorney, Agent, or Firm* — Fish & Richardson P.C.

(57) ABSTRACT

Methods, systems, and apparatus for content distribution. In one aspect, a method includes obtaining reservation data for a resource, the reservation data specifying a reservation period and a number of impression reservations for the reservation period; receiving, during the reservation period, content item request data specifying that the resource was requested; identifying candidate content item providers; determining an expected revenue that will be obtained by selecting one of the candidate content item providers to provide a content item providing, to a content item exchange, auction data including a reserve price; receiving positive response data specifying that the content item exchange will provide an exchange content item for a price that meets the reserve price; and in response to receiving the positive response data, selecting the exchange content item as the content item to be provided in response to receiving the content item request data.

36 Claims, 4 Drawing Sheets

CONTENT ITEM ALLOCATION

CROSS-REFERENCE TO RELATED APPLICATIONS

This application claims the benefit under 35 U.S.C. §119(e) of U.S. Patent Application No. 61/439,469, entitled "YIELD OPTIMIZATION OF DISPLAY ADVERTISING WITH AD EXCHANGE," filed Feb. 4, 2011, which is incorporated herein by reference in its entirety.

BACKGROUND

This specification relates to content distribution.

The Internet has enabled access to a wide variety of resources, e.g., video and/or audio files, web pages for particular subjects, and news articles. Such access to these resources has likewise enabled opportunities for providing relevant additional content. For example, resources of particular interest to a user can be identified by a search engine in response to a user query. By comparing the user query to a list of keywords specified by an advertiser, it is possible to provide relevant advertisements to the user.

Another form of online advertising is advertisement syndication, which allows advertisers to extend their marketing reach by distributing advertisements to additional partners. For example, third party publishers can place an advertiser's text or image advertisements on web pages that have content related to the advertisement. As the users are likely interested in the particular content on the publisher webpage, they are also likely to be interested in the product or service featured in the advertisement. Accordingly, such advertisement placement can help drive online customers to the advertiser's website.

In some situations, advertisements can be selected for placement on a web page based on the outcome of an auction. For example, in a generalized second price auction, the top n advertisers will be placed in the n available advertisement slots. In other situations, web page publishers enter into agreements with advertisers to allow display advertisements on their web pages for a certain period of time and/or for a certain number of impressions, or views.

SUMMARY

This specification describes technologies relating to content distribution.

In general, one innovative aspect of the subject matter described in this specification can be embodied in methods that include the actions of obtaining reservation data for a resource that is provided by a publisher, the reservation data specifying a reservation period, and a number of impression reservations for the reservation period, the number of impression reservations being a number of resource requests for which an ad slot of the resource has been reserved by one or more reservation content item providers; receiving, during the reservation period, content item request data specifying that the resource was requested; identifying one or more candidate content item providers from the one or more reservation content item providers; determining an expected revenue that will be obtained by selecting one of the candidate content item providers to provide a content item in response to receiving the content item request data; providing, to a content item exchange, auction data including a reserve price that is based on the expected revenue; receiving positive response data from the content item exchange, the positive response data specifying that the content item exchange will provide an exchange content item for a price that meets the reserve price; and in response to receiving the positive response data, selecting the exchange content item as the content item to be provided in response to receiving the content item request data. Other embodiments of this aspect include corresponding systems, apparatus, and computer programs, configured to perform the actions of the methods, encoded on computer storage devices.

These and other embodiments can each optionally include one or more of the following features. The method may include the actions of receiving, during the reservation period, second content item request data specifying that the resource was requested; identifying one or more second candidate content item providers from the one or more reservation content item providers; determining a second expected revenue that will be obtained by selecting one of the second candidate content item providers to provide a content item in response to receiving the second content item request data; providing, to the content item exchange, second auction data including a second reserve price that is based on the second expected revenue; receiving negative response data from the content item exchange, the negative response data specifying that the content item exchange will not provide an exchange content item for a price that meets the second reserve price; and in response to receiving negative response data, selecting a content item that is provided by one of the second candidate content item providers as the content item to be provided in response to receiving the second content item request data.

The method may also include the action of, in response to receiving negative response data, selecting one of the second candidate content item providers as a winning content item provider, the winning content item provider being the second candidate content item provider corresponding to a highest impression score relative to all other second candidate content item providers; and selecting a content item that is provided by one of the second candidate content item providers includes selecting a content item provided by the winning content item provider.

The method may also include the actions of, in response to receiving negative response data: determining that two or more of the second candidate content item providers each correspond to a same impression score that is a highest impression score relative to all other second candidate content item providers, assigning each of the two or more second candidate content item providers an assignment probability based on one or more characteristics associated with the resource request, and selecting one of the two or more second candidate content item providers based on the assignment probabilities; and selecting a content item that is provided by one of the second candidate content item providers includes selecting a content item that is provided by the selected second candidate content item provider.

The method may also include the actions of, in response to receiving negative response data: determining that two or more of the second candidate content item providers each correspond to a same impression score that is a highest impression score relative to all other second candidate content item providers, assigning each of the two or more second candidate content item providers an assignment probability based on a particular combination of the two or more second candidate content item providers that each correspond to the same impression score, and selecting one of the two or more second candidate content item providers based on the assignment probabilities; and selecting a content item that is provided by one of the second candidate content item providers includes selecting a content item that is provided by the selected second candidate content item provider.

The method may also include the action of determining that a number of remaining resource requests for the reservation period exceeds a number of unfulfilled impression reservations for the reservation period; and providing auction data and receiving positive response data are only performed in response to determining that the number of remaining resource requests exceeds the number of unfulfilled impression reservations.

The reserve price may be determined based on an impression score for at least one of the candidate content item providers, each impression score specifying, for a candidate content item provider, a measure of quality of the impression to the candidate content item provider. Each impression score may be based on one or more characteristics associated with the content item request data, the one or more characteristics including a predicted click-through rate. The reservation data may further specify, for each of the one or more reservation content item providers, a portion of the impression reservations that have been reserved for the reservation content item provider. Identifying one or more candidate content item providers may include identifying a reservation content item provider that has at least one unfulfilled impression reservation. The reserve price may be generated based on a function of the expected revenue and a probability of selection, and the content item to be provided in response to receiving the content item request data may be an advertisement.

Particular embodiments of the subject matter described in this specification can be implemented so as to realize one or more of the following advantages. Resource publishers are able to efficiently manage advertising and/or other content item agreements while earning revenue through a content item auction while also providing relevant advertisements or other third party content items to users accessing their resources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A content item allocation system provides a user device with a content item in response to receiving a request for a resource (or content item) from the user device. The content item allocation system may provide a content item from a content item provider who has reserved impressions from a publisher that provides the resource. Alternatively, the content item allocation system may provide a content item from a content item provider who has bid a certain price for the impression through a content item exchange. The methods and system described in this specification choose a content item to provide in a manner designed to fulfill content item reservations while potentially increasing or maximizing revenue for the publisher providing the resource and delivering more relevant content items to users.

In some implementations, the system receives reservation data for a resource. The reservation data specifies (i) a period of time, and (ii) a number of impression reservations reserved by reservation content item providers over the period of time. The system receives a request for the resource from a user device and identifies candidate content item providers from the reservation content item providers. If the estimated number of remaining impressions that will be received over the period of time is greater than the number of unfulfilled impression reservations for the period of time, the system determines expected revenue that will be obtained if one of the candidate content item providers is selected to provide a content item, and then provides a content item exchange with a reserve price that is based on the expected revenue.

The system then receives a response from the content item exchange, and the response indicates whether the content item exchange received a bid that meets or exceeds the reserve price. If the content item exchange receives a bid greater than the reserve price, the system provides a content item from the content item provider who submitted the winning bid (e.g., determined by a bid score based on quality and/or relevance signals) to the exchange. If the content item exchange does not receive a bid greater than the reserve price, or if the number of remaining impressions is not greater than the number of unfulfilled impression reservations, the system provides a content item from one of the candidate content item providers.

Example implementations are described in more detail in the sections that follow.

Example Environment

Figure 1:
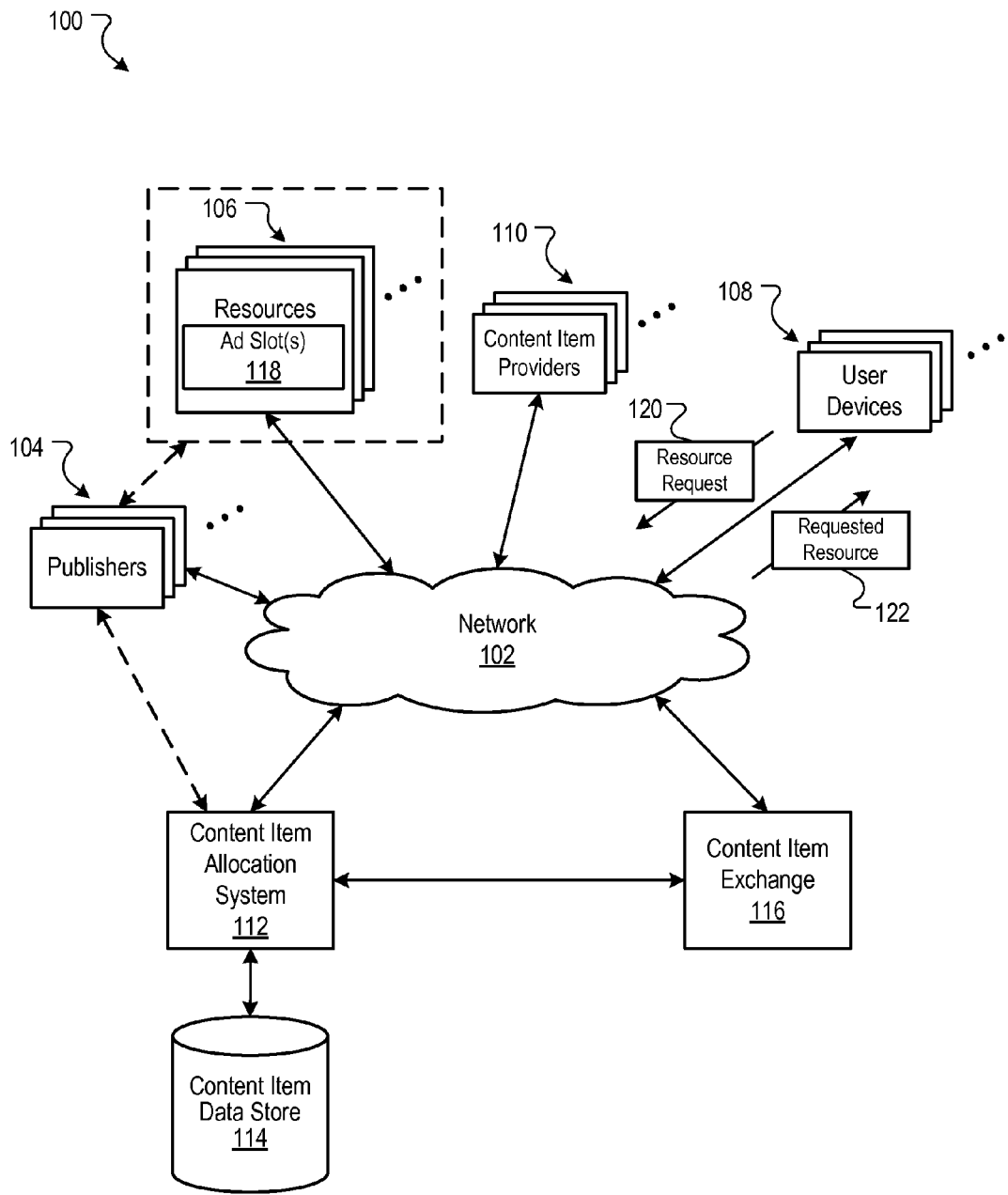
FIG. 1 is a block diagram of an example online environment in which content is provided to a user.

FIG. 1 is an illustration of an example environment 100 in which content is provided to a user. The example environment 100 includes a network 102, such as a local area network (LAN), a wide area network (WAN), the Internet, or a combination thereof. The example environment 100 also includes publishers 104 that host (directly or indirectly) resources 106, user devices 108, content item providers 110, a content item allocation system 112, a content item data store 114, and a content item exchange 116. While the content item allocation system 112 and content item exchange 116 are depicted separately, they may be realized as part of a single system.

A resource 106 is data provided over the network 102. A resource 106 is identified by a resource address that is associated with the resource 106. Resources 106 include HTML pages, word processing documents, portable document format (PDF) documents, images, video, and feed sources, to name only a few. The resources 106 can include content, such as words, phrases, images and sounds, that may include embedded information (such as meta-information in hyperlinks) and/or embedded instructions (such as scripts). Resources 106 may also include one or more ad slots 118, which are portions of a resource 106 in which advertisements or other content items are inserted.

Resources are generally hosted by publishers 104 either directly (e.g., on a server computer owned by the publisher) or indirectly (e.g., on a server computer owned by a third party but paid for by the publisher). A publisher 104 is an entity that hosts and/or provides electronic access to a resource (e.g., web page content) by use of the network 102. Publishers 104 may generate revenue by selling content item space (e.g., ad slots 118) to content item providers 110.

Content item providers 110 are entities, such as advertisers (and may also be publishers), that provide content items, such as advertisements, for display with resources 106. The content items may be any type of data, and can include, for example, informational, education, or entertainment content, as well as advertisements in the form of graphical advertisements, such as banner advertisements, text only advertisements, image advertisements, audio advertisements, video advertisements, advertisement gadgets with or without interactive features, advertisements combining one of more of any of such components, etc., or any other type of electronic advertisement or content item document. The content items may also include embedded information, such as a links, meta-information, and/or machine executable instructions, such as HTML or JavaScript™.

A user device 108 is an electronic device that is under control of a user and is capable of requesting and receiving resources 106 over the network 102. Example user devices 108 include personal computers, mobile communication devices, and other devices that can send and receive data over the network 102. A user device 108 typically includes a user application, such as a web browser, to facilitate the sending and receiving of data over the network 102.

The content item allocation system 112 may be comprised of one or more data processing apparatus, is capable of communicating across the network 102, and may be coupled to a content item data store 114. The system 112 provides content items for display with resources 106. The system 112 may be in direct or indirect communication with publishers 104 and content item providers 110 to manage publishers' content item inventory and content item providers' demands.

The content item data store 114 may store information related to the publishers 104 and content item providers 110. For example, the content item data store 114 may include, for a publisher, information about the content of resources 106 provided by the publisher, available ad slots 118, targeting rules or restrictions of the ad slots 118, and reservation data (if applicable) for ad slots reserved by one or more content item providers. The content item data store 114 may also include, for a content item provider, the content item provider's content items (e.g., advertisements) and campaign data for a content item provider indicating budgets, selection criteria, and other information relevant to a content item provider's campaign.

The content item allocation system 112 may also be coupled to a content item exchange 116 that conducts content item auctions for available ad slots 118. Content item providers 110 may be permitted to select, or bid, an amount the content item providers 110 are willing to pay for each impression of a content item, e.g., a cost-per-mille amount an advertiser pays for presentation of an advertisement (e.g., a cost-per-thousand impressions) or an amount that the content item provider pays when, for example, a user clicks on an advertisement (e.g., a cost-per-click). The cost-per-click can include a maximum cost-per-click, e.g., the maximum amount an advertiser is willing to pay for each click of an advertisement based on a keyword that is used to select the advertisement. For example, advertisers A, B, and C all select, or bid, a maximum cost-per-click of $0.50, $0.75, and $1.00, respectively. The content item exchange 116 can select the advertisement provided by the highest bidding advertiser and provide that advertisement for display in the auctioned ad slot 118. In some implementations, quality and/or relevance signals are used to determine a bid score, and the advertisement with the highest bid score can be selected for display.

When a user device 108 submits a resource request 120 to a publisher 104, the publisher 104 causes the requested resource 122 to be provided to the user device 108 in response to the request 120. The requested resource 122 content can include executable instructions that can be executed at the user device 108 to request content items from the content item allocation system 112. When the content item allocation system 112 receives a request for a content item, it may (i) provide a content item from a content item provider 110 who has an agreement with the publisher 104 to provide a content item for the requested resource 122, (ii) provide a content item obtained from the content item exchange 116, or (iii) provide no content item. In some implementations, the content item allocation system 112 chooses the option that is designed to provide the most revenue for the publisher, while also fulfilling all content item reservations. Further detail regarding the operation of the content item allocation system 112 is provided in the paragraphs that follow.

Figure 2:
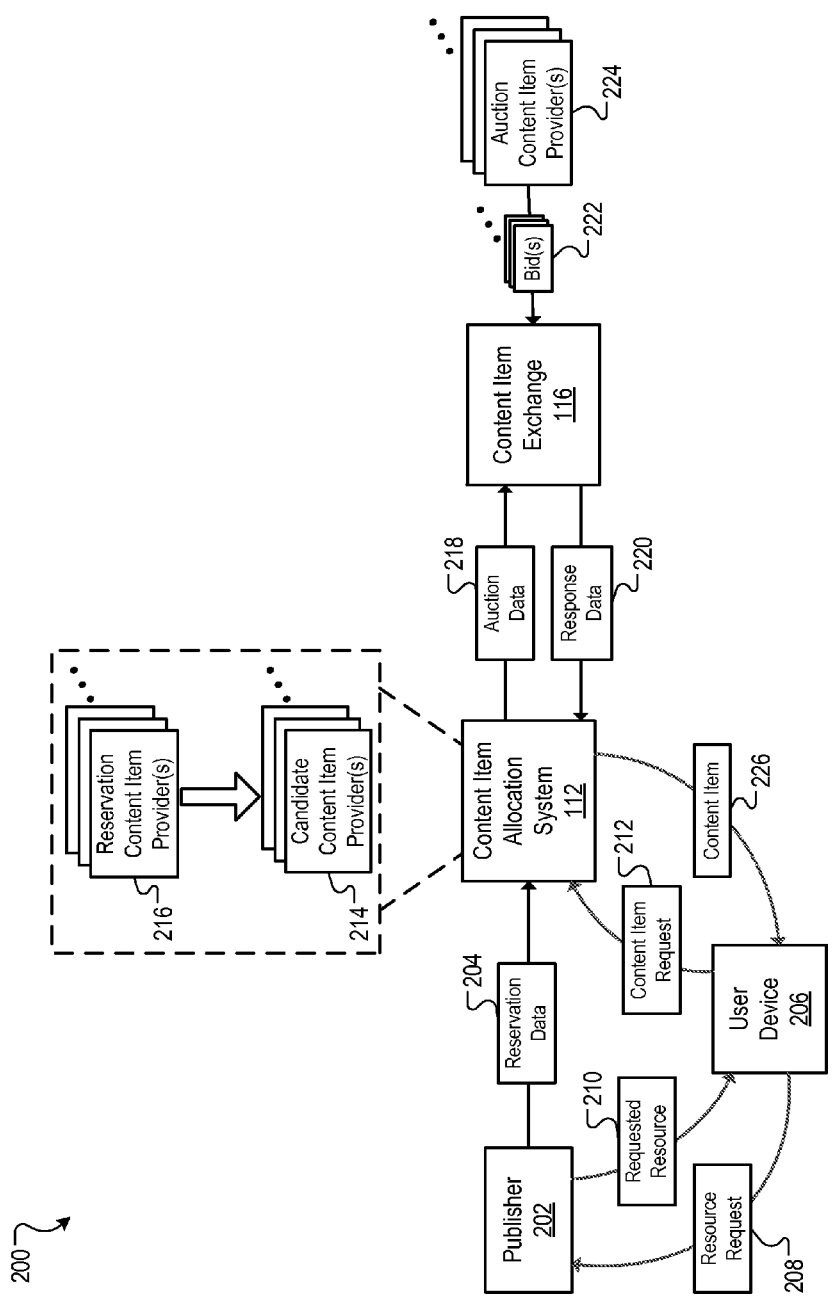
FIG. 2 is a block diagram of an example data flow for selecting a content item for presentation with a resource.

FIG. 2 is a block diagram of an example data flow 200 for selecting a content item for presentation with a resource. The content item allocation system 112 obtains reservation data 204 for a resource provided by a publisher 202. In some implementations, the reservation data 204 is provided to the content item allocation system 112 by the publisher 202 and/or content item providers who reserve impressions. In some implementations, the reservation data 204 specifies a reservation period—e.g., a day, week, or month—and a total number of impression reservations for the reservation period. The total number of impression reservations is a number of resource requests for which an ad slot of the resource has been reserved by one or more reservation content item providers. Reservation data may be provided for any number of resources provided by the publisher 202.

For example, the publisher of a sports news web site may have a web page dedicated to baseball news, and that web page may include an ad slot. The publisher may have entered into an agreement with an advertiser who runs an online baseball equipment store, and the agreement might specify that the publisher has agreed to serve the advertiser's advertisement in the ad slot 1,000 times per week for 6 weeks. The agreement may specify other information, such as selection criteria (e.g., restrictions on which ads can be served to what type of web site visitor at what time of day, etc.), particular advertisements to be served (if more than one), and/or price(s) to be paid. The price(s) may be a lump sum, a price per thousand impressions, a price per click, a variable price (e.g., one that depends on satisfaction of one or more selection criteria), or any other appropriate price or combination of prices.

The reservation data for the baseball news web page may include any of the foregoing information, but it at least includes a reservation period (e.g., a week), and a number of impression reservations for that week (e.g., 1,000 in the foregoing example). The reservation period that is referred to throughout this document may or may not match time periods set forth in an agreement between the publisher and content item provider. For example, an advertiser might enter into a month-long agreement to reserve 1 million impressions, while the reservation period may be a proper subset of that period (e.g., 1 day). The reservation data for the baseball news web page would also include impression reservation data for any other advertisers who have agreed to provide advertisements in the example ad slot—or any other ad slots on the web page.

In some implementations, a user device 206 sends a resource request 208 to the publisher 202 and receives the requested resource 210 in return. The requested resource 210 may cause the user device 206 to transmit a content item request 212 to the content item allocation system 112. For example, the requested resource 210 may include code (e.g., one or more scripts) that, when executed by the user device 206, causes the user device 206 to issue a content item request 212 to the content item allocation system. The content item request 212 may include any information relevant to the provision of a content item—e.g., the requested resource and user data that can be used to determine if applicable selection criteria are met. In some implementations, the publisher 202, after receiving the resource request 208, may send a content item request to the content item allocation system 112, receive a content item in return, and provide both the requested resource and the content item to the user device 206. Such an implementation would not require the user device 206 to initiate the content item request.

The content item allocation system 112 identifies candidate content item providers 214 from the reservation content item providers 216 that were specified by the reservation data 204. In some implementations, the reservation data 204 specifies the portion of the total impression reservations that have been reserved by each reservation content item provider 216 and the number of unfulfilled impression reservations (i.e., the number of impression reservations that still need to be fulfilled during the reservation period) for each reservation content item provider 216. In some implementations, a reservation content item provider 216 is only identified as a candidate content item provider if it has at least one unfulfilled impression reservation.

For example, the reservation data for a baseball news web page may indicate that there are three reservation advertisers for that page—advertiser1, advertiser2, and advertiser3. The reservation data may further specify the number of unfulfilled impression reservations for each advertiser for the reservation period. If the reservation period is one day and advertiser1 has reserved 100 advertisement impressions for that day, 90 of them may have already been fulfilled, leaving 10 reserved impressions unfulfilled for the day. Similarly, advertiser2 may have 5 unfulfilled impressions, and advertiser3 may have 0 unfulfilled impressions (indicating that advertiser3's reserved impressions have already been fulfilled). In some implementations, advertiser1 and advertiser2 will be identified as candidate advertisers based on each of them having at least one unfulfilled impression. Because advertiser3 has no unfulfilled impressions (e.g., its reserved impressions have already been fulfilled or are 0 for the reservation period), advertiser3 will not be identified as a candidate advertiser.

In some implementations, the content item allocation system 112 determines whether an estimated number of remaining resource requests for the reservation period exceeds a number of unfulfilled impression reservations for that period. For example, the reservation data for a resource may specify the expected number of resource requests for the reservation period—e.g., the publisher of the baseball news web page may provide an estimated number of visitors to the web page per day based on historical data. The estimated number of remaining resource requests may be based on, for example, historical resource requests logged by the publisher, the content item allocation system, or a third party. The expected number of resource requests may be compared to the total number of unfulfilled impressions reservations for the reservation period.

In response to determining that the number of remaining resource requests does not exceed the number of unfulfilled impression reservations, the content item allocation system 112 may provide a content item from one of the candidate content item providers without requesting a content item from the content item exchange 116. For example, submitting auction data 218 (discussed in further detail below) to the content item exchange 116 may be conditioned on there being more remaining resource requests than unfulfilled impression reservations. This condition is designed to prevent a publisher from failing to fulfill the reservation content item providers' impression reservations. In response to determining that the number of remaining resource requests exceeds the number of unfulfilled impression reservations, the content item allocation system 112 continues the process of selecting a content item to be displayed with the requested resource.

The content item allocation system 112 determines an expected revenue that will be earned by selecting one of the candidate content item providers 214 to provide a content item to the user device 206 in response to the content item request 212. In some implementations, the expected revenue is simply the amount the candidate content item provider 214 has agreed to pay for a reserved impression. For example, advertiser1 may have agreed to pay $500 for a thousand impressions, which results in $0.50 per impression, and advertiser2 may have agreed to pay $400 for a thousand impressions, which results in $0.40 per impression. The expected revenue may be $0.50 (based on the highest amount offered by a candidate advertiser), or some other amount, such as $0.45 (an average of the amounts offered by the candidate advertisers) or $0.40 (the lowest amount offered by a candidate advertiser). Generally, in order to achieve a threshold revenue (e.g., a highest revenue) for the publisher, the expected revenue will be based on the highest amount offered by a candidate advertiser ($0.50 in this example).

In some implementations, the expected revenue is determined based on other factors, such as an impression score for one or more of the candidate content item providers. An impression score specifies, for a candidate content item provider, a measure of quality of the impression reservation. An impression score may be candidate content item provider specific, and increase or decrease based on characteristics associated with the content item request. One such characteristic is a predicted click-through rate (pCTR) of an impression. The pCTR of an impression is an estimated likelihood that a user will click on a content item. pCTRs may be based on many factors, such as a quality associated with the particular resource being presented (e.g., a historic click-through rate for all content items presented with the resource), the content item, the content item provider, the content item campaign, and the user (or users). The quality of the foregoing factors may be based on past performance of one or more of the factors. As described in more detail below, the impression score of a particular impression for a particular reservation content item provider can also be based on a capacity constraint indicative of a portion of all available impressions that have been reserved by the particular reservation content item provider.

The impression score may affect the expected revenue if a candidate content item provider's offer for an impression depends on the score. For example, candidate advertiser1 may specify that the amount it is willing to pay for a reserved impression depends on the pCTR of the impression, e.g., by offering a product of the offer ($0.50) and the pCTR of the impression. Thus, if the pCTR for a given impression is 60% (e.g., there is a 60% chance that this impression will be clicked on by this user), advertiser1's offer of $0.50 may be decreased to $0.30 ($0.50*0.6=$0.30). Many suitable factors may be considered in calculating an impression score or pCTR, and many suitable formulae exist for creating a candidate content item provider's dependency on impression score or pCTR.

The impression score for a particular impression may vary on a per-content item provider basis and be based on selection criteria specified by the content item provider. In some implementations, the impression score for a particular impression may be directly proportional to a level of match between content item provider selection criteria and characteristics of the impression (e.g., demographic and geographic information for the user to which an advertisement will be presented). Thus, as the level of match between a content item provider's selection criteria and characteristics of the impression increases, so will the impression score for that impression with respect to that content item provider.

The impression score can be considered an indication of the value of a particular impression, such that a content item provider may be willing to pay more for impressions having higher impression scores, which may increase the expected revenue for that impression. For example, the reservation data 204 may indicate that advertiser2 offers a variable price for an impression based on selection criteria that are met by data included in the content item request 212, such as user profile information. Accordingly, advertiser2 may be willing to pay more for an impression that satisfies its selection criteria, such as a user's geographic location. If the user profile associated with the content item request 212 indicates that a user is in the United States, advertiser2 may increase its offer for the particular impression by $0.20, and if the user is in the Eastern time zone, advertiser2 may increase its offer for the particular impression by $0.15. Thus, if the user submitting the content item request 212 is in the United States and in the Eastern time zone, the expected revenue earned by selecting advertiser2 may be $0.75 ($0.40+$0.20+$0.15=$0.75). Many other suitable factors and selection criteria exist and may be considered in determining an expected revenue.

In some implementations, a user may choose to opt-in to and/or opt-out of the inclusion of user data in the content item request. For example, if a user opts into the inclusion of user data with the content item request, the content item allocation system can use the user data to provide content items that may be relevant to that user. If a user chooses to opt-out of the inclusion of user data with the content item request, the content item allocation system does not use user data when selecting a content item to be provided. In some implementations, user data is anonymized to protect privacy.

The content item allocation system 112 provides auction data 218 to the content item exchange 116, and the auction data 218 includes a reserve price that can be based on the expected revenue for a particular impression. In some implementations, the reserve price included in the auction data is the expected revenue or the expected revenue plus $0.01. For example, if the expected revenue is $0.50 (e.g., the expected revenue earned by selecting candidate advertiser, advertiser1), the reserve price may be $0.51. This reserve price represents the minimum price that will be accepted from a content item provider bidding for the impression through the content item exchange 116. The auction data 306 may also include other data of interest to potential content item providers bidding for the impression, such as user data that was included in the content item request 212 or data specifying characteristics of the requested resource 210. Other methods of determining that reserve price can also be used, as described in more detail below.

In some implementations, the content item allocation system 112 obtains a reserve price that is generated based on the expected revenue and a probability of selection. The probability of selection is the probability that an available impression will receive a winning bid at a given price. For example, if an available impression is auctioned for $1.00, the probability that a content item provider will bid that amount may be 80%. The probability of selection may be based on many factors, such as the price, and/or a quality of the resource, publisher, or user data associated with the available impression. The probability of selection may be based on historical data, and may be calculated by the content item allocation system 112, the content item exchange 116, or any other suitable third party.

Relationship (1) provided below can be used to generate an auction reserve price based on an opportunity cost and the probability of allocating the impression through a content item exchange. The opportunity cost represents what a publisher 202 stands to lose if the available impression is not awarded to a reservation content item provider 214. For example, the opportunity cost may be equal to the expected revenue that the publisher 202 will receive by awarding the impression to a reservation content item provider. The auction reserve price may be based on the solution to the following example problem:

$$R(c) = \max_{p \geq 0} F(p)p + (1 - F(p))c; \quad (1)$$

where, c is the opportunity cost of not allocating the impression to a reservation content item provider;

R(c) is the estimated revenue given opportunity cost c;

F(p) is the probability of allocating the impression through the content item exchange at a price of p.

Relationship (1) is solved to identify the price p at which $F(p)p+(1-F(p))c$ is maximized. If c=expected revenue=$0.50, solving the above problem will result in the maximum estimated revenue R(c), and the price p that solves the problem becomes the auction reserve price. For example, if F($1.00) is 0.5 (e.g., the probability that a winning bid will be received if the impression is auctioned with a price of $1.00 is 50%), relationship (1) results in an estimated revenue value of $0.75 (0.5*$1.00+(1−0.5)*$0.50=$0.50+$0.25=$0.75). By way of further example, if F($0.80) is 0.9, the function results in an estimated revenue value of $0.77 (0.9*$0.80+(1−0.9)*$0.50=$0.72+$0.05=$0.77). If the estimated revenue value of $0.77 is the maximum estimated revenue value, then the auction reserve price is the price p ($0.80) that maximizes the function (e.g., the value that solves the above problem). The numbers provided in the preceding example are for purposes of illustration only, and according to relationship (1) the price p that would be the value of p that maximizes R(c).

Relationship (1) and the discussion above provide one example of a method for generating an auction reserve price based on the expected revenue and probability of selection. In some implementations, other factors are considered in generating the auction reserve price. For example, user profile information or pCTR associated with the available impression can be used to adjust the auction reserve price for a particular impression. Any other suitable factors relevant to probability of selection may be used to generate the auction reserve price.

Additionally, the impression scores for a particular impression may be used to adjust the reserve price for the particular impression. In some implementations, the price p computed above can be scaled using the impression score, as illustrated by relationship 2.

$$\text{reserve price} = p(\max_{a \in An}\{0, Q_{n,a} - v_a\}) \quad (2)$$

where, reserve price is the minimum price that an content item provider must pay to obtain impression n through the content item exchange;

p is the price p that maximizes relationship 1 for opportunity cost c, e.g., $p(c)=\max_{a \in An}\{0, Q_{n,a}-v_a\}$;

$A_n$ denotes the set of content item providers that have unfulfilled impressions remaining (e.g., the set of candidate content item providers)

n denotes a particular impression;

$\{Q_{n,a}-v_a\}$ is the impression score of impression n for content item provider a;

$Q_{n,a}$ is a measure of impression quality for impression n to content item provider a; and $v_a$ is a value indicative of a capacity constraint for content item provider a.

In some implementations, the value $v_a$ can be obtained for each reservation content item provider using relationship (3).

$$\text{Min}_{v_a}\{E[R(\max\{Q_a-v_a\})+\Sigma_{a \in A}v_a \rho_a]\} \quad (3)$$

where, the expectation E is taken of random impressions according to some distribution. In some implementations, the estimate of this distribution may be obtained using historical data;

R is the expected revenue for a set of impressions to be received over a time period; and $\rho_a$ is the number of reservation impressions for content item provider a relative to a total number of impressions in the set of impressions.

Once the reserve price has been determined, this reserve price is provided to the content item exchange 116 with the auction data 218, and the content item exchange 116 can attempt to allocate the impression at a price that is higher than the reserve price. For example, the content item exchange 116 may receive one or more bids 222 from one or more auction content item providers 224 who wish to provide an exchange content item (i.e., a content item that is distributed by the content item exchange 116) for the available impression. The content item exchange 116 may select a winning content item provider based on the bids 222 (e.g., the highest bidding auction content item provider may be selected as the winning content item provider).

If the bid submitted by the winning content item provider meets the reserve price, the content item exchange 116 provides positive response data to the content item allocation system 112. For example, if the auction data 218 specifies a reserve price of $0.80, the content item exchange 116 conducts an auction with a minimum bid of $0.80. If a bid is received that is greater than $0.80, the content item exchange 116 provides positive response data to the content item allocation system 112. In some implementations, the positive response data specifies the exchange content item provided by the winning content item provider and/or the winning bid.

If the content item exchange 116 is unable to allocate the impression at a price that exceeds the auction reserve price, the response data 220 provided by the content item exchange 116 is negative response data that specifies that the content item exchange 116 will not provide an exchange content item for a price that meets the reserve price. For example, if the content item exchange 116 conducts an auction, but fails to receive a bid greater than the reserve price, the content item exchange 116 provides negative response data to the content item allocation system 112.

In response to receiving positive response data, the content item allocation system 112 selects the exchange content item as the content item 226 to be provided in response to the content item request 212. In some implementations, the content item allocation system 112 provides the user device 206 with the content item 226. In some implementations, the content item allocation system 112 provides the user device 206 with data that causes the user device 206 to obtain and display the content item 226. For example, the content item allocation system 112 may provide the user device 206 with code that, when executed by the user device 206, obtains the content item from a content item provider (e.g., the winning content item provider).

In response to receiving negative response data, the content item allocation system 112 selects a content item that is provided by one of the candidate content item providers 214 as the content item 226 to be provided in response to the content item request 212. In some implementations, the content item allocation system 112 selects the candidate content item provider with the highest impression score relative to all other candidate content item providers as a winning content item provider, and selects a content item that is provided by the winning content item provider as the content item 226 to be provided in response to the content item request 212.

In some implementations, in response to receiving negative response data, the content item allocation system 112 may determine that two or more candidate content item providers 214 both have the highest impression score for the impression being allocated. In this situation, the two or more candidate content item providers are considered to have tied in the allocation process. Many suitable methods for breaking a tie exist, and some example methods for breaking ties are described in the paragraphs that follow.

In some implementations, each of the candidate content item providers having the highest impression score is assigned an assignment probability based on one or more characteristics associated with the content item request, such as a pCTR. For example, if candidate advertiser1 offers an advertisement with a pCTR of 0.6 (e.g., a 60% chance that its advertisement will be clicked on by the user associated with the user device 206), and candidate advertiser2 offers an advertisement with a pCTR of 0.5 (e.g., a 50% chance that its advertisement will be clicked on by the user associated with the user device 206), the assignment probability for candidate advertised may be 0.545 (0.6/(0.6+0.5)=0.6/1.1=0.545, or 54.5%), and the assignment probability for candidate advertiser2 may be 0.455 (0.5/(0.6+0.5)=0.5/1.1=0.455, or 45.5%). In turn, the impression can be pseudo-randomly assigned to one of advertiser1 and advertiser2, where the assignment is constrained by the assignment probabilities. Any suitable content item request characteristics and/or formula may be used to calculate the assignment probability for each candidate content item provider.

In some implementations, each of the candidate content item providers that had the same highest impression score is assigned an assignment probability based on the number of unfulfilled impressions for each of the tied candidate content item providers. For example, if candidate advertiser1 has 10 unfulfilled impression reservations to fulfill, and candidate advertiser2 has 5 unfulfilled impression reservations to fulfill, the assignment probability may be based on the ratio of their unfulfilled impressions. The assignment probability for candidate advertiser1 may be 0.66 (10/(10+5)=10/15=0.66, or 66%), and the assignment probability for candidate advertiser2 may be 0.33 (5/(10+5)=5/15=0.33, or 33%). Any suitable data associated with the candidate content item providers and/or formula may be used to calculate the assignment probability for each candidate content item provider.

In some implementations, a candidate content item provider is selected to receive the impression based on the assignment probabilities. In the first example above, the assignment probabilities indicate that candidate advertiser1 has a 54.5% chance of being selected, and candidate advertiser2 has a 45.5% chance of being selected. In the second example above, the assignment probabilities indicate that candidate advertiser1 has a 66% chance of being selected, and candidate advertiser2 has a 33% chance of being selected. Any suitable method of selection based on the probabilities may be used. For example, the impression can be allocated pseudo-randomly as constrained by the probabilities, such that a particular allocation is pseudo-random, while the allocation of multiple impressions is constrained by the probabilities. In some implementations, the assignment probabilities of each candidate content item provider are chosen such that the total expected impressions that a reservation content item provider receives in this way is equal to the number of impressions reserved by that content item provider.

Figure 3:
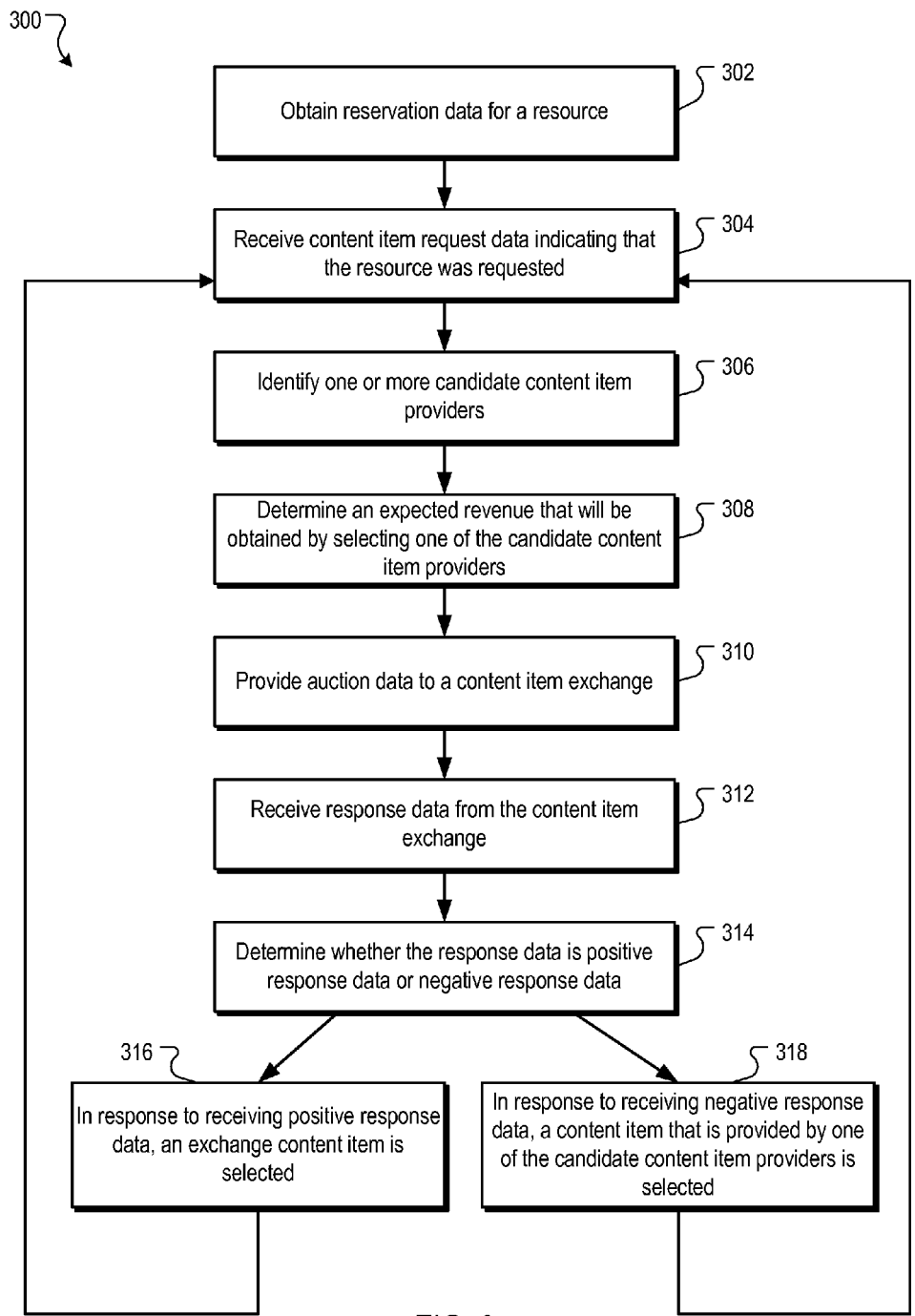
FIG. 3 is a flow diagram of an example process for selecting a content item to be provided to a user device.

FIG. 3 is a flow diagram of an example process 300 for selecting a content item to be provided to a user device. The process 300 may be performed by one or more data processing apparatus of the content item allocation system 112.

Reservation data is obtained for a resource (302). In some implementations, the resource is provided by a publisher, and the reservation data specifies (i) a reservation period; and (ii) a number of impression reservations being a number of resource requests for which an ad slot of the resource has been reserved by one or more reservation content item providers. In some implementations, the reservation data further specifies, for each reservation content item provider, a portion of the impression reservations that have been reserved for that reservation content item provider.

Content item request data indicating that the resource was requested is received (304). In some implementations, the content item request data is received from a user device. In some implementations, the content item request data is received from a publisher.

One or more candidate content item providers are identified (306). In some implementations, the one or more candidate content item providers are identified from the reservation content item providers. For example, a reservation content item provider may only be identified as a candidate content item provider if it has at least one unfulfilled impression reservation.

An expected revenue that will be obtained by selecting one of the candidate content item providers is determined (308). In some implementations, the expected revenue is the amount that will be obtained by providing a content item from one of the candidate content item providers in response to the content item request. In some implementations, the expected revenue may be determined based on an impression score for one of the candidate content item providers, the impression score specifying a measure of quality of the impression reservation with respect to the candidate content item provider. The impression score may be based on one or more characteristics associated with the content item request (and/or the resource request). For example, one of the characteristics may be a predicted click-through rate.

Auction data is provided to the content item exchange (310). In some implementations, the auction data includes a reserve price that is based on the expected revenue. In some implementations, the reserve price is generated based on a function of the expected revenue and a probability of selection, the probability of selection indicating the likelihood that an available impression would receive a bid on a content item auction. In some implementations, the reserve price is based on the impression score associated with one of the candidate content item providers. In another implementation, the auction data is only provided in response to determining that a number of remaining resource requests for the reservation period exceeds a number of unfulfilled impressions reservations for the reservation period.

Response data is received from the content item exchange (312). In some implementations, the response data indicates whether or not the content item exchange will provide an exchange content item for a price that meets the reserve price. In some implementations, response data is not received. For example, if the number of remaining resource requests for the reservation period does not exceed the number of unfulfilled impression reservations, the response data may not be received.

Whether the response data is positive response data or negative response data is determined (314). In response to receiving positive response data, the exchange content item is selected as the content item to be provided in response to the content item request (316). In response to receiving negative response data, the content item that is provided by one of the candidate content item providers is selected as the content item to be provided in response to the content item request (318).

In some implementations, the process 300 may loop back to step 304 after completion of step 316 or 318. In this manner, multiple content item requests can be received, and multiple content items may be selected for each of a plurality of resource requests.

Figure 4:
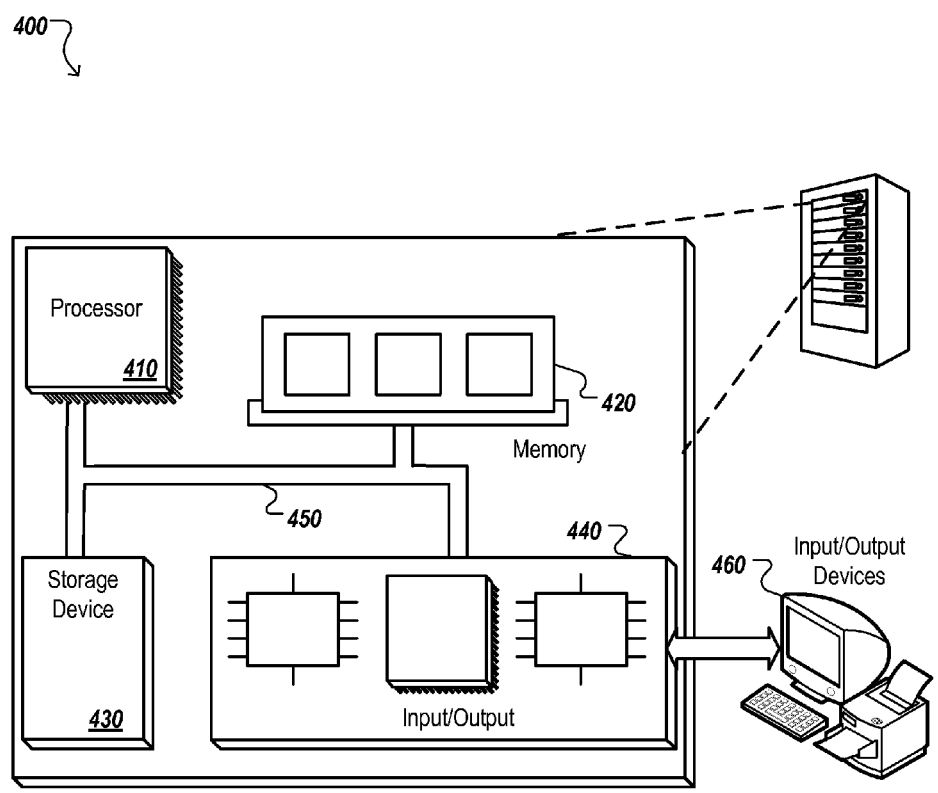
FIG. 4 is a block diagram of an example data processing apparatus.

FIG. 4 is a block diagram of an example data processing apparatus 400 that can be used to perform operations described above. The apparatus 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the apparatus 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the apparatus 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the apparatus 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example data processing apparatus has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
obtaining, by a data processing apparatus, reservation data for a resource that is provided by a publisher, the reservation data specifying:
a reservation period; and
a number of impression reservations for the reservation period, the number of impression reservations being a number of resource requests for which an ad slot of the resource has been reserved by one or more reservation content item providers;
receiving, by the data processing apparatus and during the reservation period, content item request data specifying that the resource was requested;
identifying, by the data processing apparatus, one or more candidate content item providers from the one or more reservation content item providers;
determining, by the data processing apparatus, an expected revenue that will be obtained by selecting one of the candidate content item providers to provide a content item in response to receiving the content item request data;
providing, by the data processing apparatus and to a content item exchange, auction data including a reserve price that is based on the expected revenue;
receiving, by the data processing apparatus, positive response data from the content item exchange, the positive response data specifying that the content item exchange will provide an exchange content item for a price that meets the reserve price; and
in response to receiving the positive response data, selecting, by the data processing apparatus, the exchange content item as the content item to be provided in response to receiving the content item request data.

2. The method of claim 1, further comprising:
receiving, during the reservation period, second content item request data specifying that the resource was requested;
identifying one or more second candidate content item providers from the one or more reservation content item providers;
determining a second expected revenue that will be obtained by selecting one of the second candidate content item providers to provide a content item in response to receiving the second content item request data;
providing, to the content item exchange, second auction data including a second reserve price that is based on the second expected revenue;
receiving negative response data from the content item exchange, the negative response data specifying that the content item exchange will not provide an exchange content item for a price that meets the second reserve price; and
in response to receiving negative response data, selecting a content item that is provided by one of the second candidate content item providers as the content item to be provided in response to receiving the second content item request data.

3. The method of claim 2, further comprising:
in response to receiving negative response data, selecting one of the second candidate content item providers as a winning content item provider, the winning content item provider being the second candidate content item provider corresponding to a highest impression score relative to all other second candidate content item providers; and
wherein selecting a content item that is provided by one of the second candidate content item providers comprises selecting a content item provided by the winning content item provider.

4. The method of claim 2, further comprising:
in response to receiving negative response data:
determining that two or more of the second candidate content item providers each correspond to a same impression score that is a highest impression score relative to all other second candidate content item providers;
assigning each of the two or more second candidate content item providers an assignment probability based on one or more characteristics associated with the resource request; and selecting one of the two or more second candidate content item providers based on the assignment probabilities; and wherein selecting a content item that is provided by one of the second candidate content item providers comprises selecting a content item that is provided by the selected second candidate content item provider.

5. The method of claim 2, further comprising:

in response to receiving negative response data:

determining that two or more of the second candidate content item providers each correspond to a same impression score that is a highest impression score relative to all other second candidate content item providers;

assigning each of the two or more second candidate content item providers an assignment probability based on a particular combination of the two or more second candidate content item providers that each correspond to the same impression score; and selecting one of the two or more second candidate content item providers based on the assignment probabilities; and wherein selecting a content item that is provided by one of the second candidate content item providers comprises selecting a content item that is provided by the selected second candidate content item provider.

6. The method of claim 1, further comprising:

determining that a number of remaining resource requests for the reservation period exceeds a number of unfulfilled impression reservations for the reservation period; and wherein the providing auction data and receiving positive response data are only performed in response to determining that the number of remaining resource requests exceeds the number of unfulfilled impression reservations.

7. The method of claim 1, wherein the reserve price is determined based on an impression score for at least one of the candidate content item providers, each impression score specifying, for a candidate content item provider, a measure of quality of the impression to the candidate content item provider.

8. The method of claim 7, wherein each impression score is based on one or more characteristics associated with the content item request data, the one or more characteristics including a predicted click-through rate.

9. The method of claim 1, wherein the reservation data further specifies, for each of the one or more reservation content item providers, a portion of the impression reservations that have been reserved for the reservation content item provider.

10. The method of claim 9, wherein identifying one or more candidate content item providers comprises identifying a reservation content item provider that has at least one unfulfilled impression reservation.

11. The method of claim 1, wherein the reserve price is generated based on a function of the expected revenue and a probability of selection.

12. The method of claim 1, wherein the content item to be provided in response to receiving the content item request data is an advertisement.

13. A system comprising:

a data processing apparatus; and a data store storing instructions that, upon execution, cause the data processing apparatus to perform operations comprising:

obtaining reservation data for a resource that is provided by a publisher, the reservation data specifying:

a reservation period; and a number of impression reservations for the reservation period, the number of impression reservations being a number of resource requests for which an ad slot of the resource has been reserved by one or more reservation content item providers;

receiving, during the reservation period, content item request data specifying that the resource was requested;

identifying one or more candidate content item providers from the one or more reservation content item providers;

determining an expected revenue that will be obtained by selecting one of the candidate content item providers to provide a content item in response to receiving the content item request data;

providing, to a content item exchange, auction data including a reserve price that is based on the expected revenue;

receiving positive response data from the content item exchange, the positive response data specifying that the content item exchange will provide an exchange content item for a price that meets the reserve price; and in response to receiving the positive response data, selecting the exchange content item as the content item to be provided in response to receiving the content item request data.

14. The system of claim 13, wherein the operations further comprise:

receiving, during the reservation period, second content item request data specifying that the resource was requested;

identifying one or more second candidate content item providers from the one or more reservation content item providers;

determining a second expected revenue that will be obtained by selecting one of the second candidate content item providers to provide a content item in response to receiving the second content item request data;

providing, to the content item exchange, second auction data including a second reserve price that is based on the second expected revenue;

receiving negative response data from the content item exchange, the negative response data specifying that the content item exchange will not provide an exchange content item for a price that meets the second reserve price; and in response to receiving negative response data, selecting a content item that is provided by one of the second candidate content item providers as the content item to be provided in response to receiving the second content item request data.

15. The system of claim 14, wherein the operations further comprise:

in response to receiving negative response data, selecting one of the second candidate content item providers as a winning content item provider, the winning content item provider being the second candidate content item provider corresponding to a highest impression score relative to all other second candidate content item providers; and wherein selecting a content item that is provided by one of the second candidate content item providers comprises selecting a content item provided by the winning content item provider.

16. The system of claim 14, wherein the operations further comprise:

in response to receiving negative response data:

determining that two or more of the second candidate content item providers each correspond to a same impression score that is a highest impression score relative to all other second candidate content item providers;

assigning each of the two or more second candidate content item providers an assignment probability based on one or more characteristics associated with the resource request; and selecting one of the two or more second candidate content item providers based on the assignment probabilities; and wherein selecting a content item that is provided by one of the second candidate content item providers comprises selecting a content item that is provided by the selected second candidate content item provider.

17. The system of claim 14, wherein the operations further comprise:

in response to receiving negative response data:
determining that two or more of the second candidate content item providers each correspond to a same impression score that is a highest impression score relative to all other second candidate content item providers;
assigning each of the two or more second candidate content item providers an assignment probability based on a particular combination of the two or more second candidate content item providers that each correspond to the same impression score; and
selecting one of the two or more second candidate content item providers based on the assignment probabilities; and
wherein selecting a content item that is provided by one of the second candidate content item providers comprises selecting a content item that is provided by the selected second candidate content item provider.

18. The system of claim 13, wherein the operations further comprise:

determining that a number of remaining resource requests for the reservation period exceeds a number of unfulfilled impression reservations for the reservation period; and
wherein the providing auction data and receiving positive response data are only performed in response to determining that the number of remaining resource requests exceeds the number of unfulfilled impression reservations.

19. The system of claim 13, wherein the reserve price is determined based on an impression score for at least one of the candidate content item providers, each impression score specifying, for a candidate content item provider, a measure of quality of the impression to the candidate content item provider.

20. The system of claim 19, wherein each impression score is based on one or more characteristics associated with the content item request data, the one or more characteristics including a predicted click-through rate.

21. The system of claim 13, wherein the reservation data further specifies, for each of the one or more reservation content item providers, a portion of the impression reservations that have been reserved for the reservation content item provider.

22. The system of claim 21, wherein identifying one or more candidate content item providers comprises identifying a reservation content item provider that has at least one unfulfilled impression reservation.

23. The system of claim 13, wherein the reserve price is generated based on a function of the expected revenue and a probability of selection.

24. The system of claim 13, wherein the content item to be provided in response to receiving the content item request data is an advertisement.

25. A non-transitory computer-readable medium encoded with instructions that when executed by a data processing apparatus cause the data processing apparatus to perform operations comprising:

obtaining reservation data for a resource that is provided by a publisher, the reservation data specifying:
a reservation period; and
a number of impression reservations for the reservation period, the number of impression reservations being a number of resource requests for which an ad slot of the resource has been reserved by one or more reservation content item providers;
receiving, during the reservation period, content item request data specifying that the resource was requested;
identifying one or more candidate content item providers from the one or more reservation content item providers;
determining an expected revenue that will be obtained by selecting one of the candidate content item providers to provide a content item in response to receiving the content item request data;
providing, to a content item exchange, auction data including a reserve price that is based on the expected revenue;
receiving positive response data from the content item exchange, the positive response data specifying that the content item exchange will provide an exchange content item for a price that meets the reserve price; and
in response to receiving the positive response data, selecting the exchange content item as the content item to be provided in response to receiving the content item request data.

26. The computer-readable medium of claim 25, wherein the operations further comprise:

receiving, during the reservation period, second content item request data specifying that the resource was requested;
identifying one or more second candidate content item providers from the one or more reservation content item providers;
determining a second expected revenue that will be obtained by selecting one of the second candidate content item providers to provide a content item in response to receiving the second content item request data;
providing, to the content item exchange, second auction data including a second reserve price that is based on the second expected revenue;
receiving negative response data from the content item exchange, the negative response data specifying that the content item exchange will not provide an exchange content item for a price that meets the second reserve price; and
in response to receiving negative response data, selecting a content item that is provided by one of the second candidate content item providers as the content item to be provided in response to receiving the second content item request data.

27. The computer-readable medium of claim 26, wherein the operations further comprise:

in response to receiving negative response data, selecting one of the second candidate content item providers as a winning content item provider, the winning content item provider being the second candidate content item provider corresponding to a highest impression score relative to all other second candidate content item providers; and wherein selecting a content item that is provided by one of the second candidate content item providers comprises selecting a content item provided by the winning content item provider.

28. The computer-readable medium of claim 26, wherein the operations further comprise:
in response to receiving negative response data:
determining that two or more of the second candidate content item providers each correspond to a same impression score that is a highest impression score relative to all other second candidate content item providers;
assigning each of the two or more second candidate content item providers an assignment probability based on one or more characteristics associated with the resource request; and
selecting one of the two or more second candidate content item providers based on the assignment probabilities; and
wherein selecting a content item that is provided by one of the second candidate content item providers comprises selecting a content item that is provided by the selected second candidate content item provider.

29. The computer-readable medium of claim 26, wherein the operations further comprise:
in response to receiving negative response data:
determining that two or more of the second candidate content item providers each correspond to a same impression score that is a highest impression score relative to all other second candidate content item providers;
assigning each of the two or more second candidate content item providers an assignment probability based on a particular combination of the two or more second candidate content item providers that each correspond to the same impression score; and
selecting one of the two or more second candidate content item providers based on the assignment probabilities; and
wherein selecting a content item that is provided by one of the second candidate content item providers comprises selecting a content item that is provided by the selected second candidate content item provider.

30. The computer-readable medium of claim 25, wherein the operations further comprise:
determining that a number of remaining resource requests for the reservation period exceeds a number of unfulfilled impression reservations for the reservation period; and
wherein the providing auction data and receiving positive response data are only performed in response to determining that the number of remaining resource requests exceeds the number of unfulfilled impression reservations.

31. The computer-readable medium of claim 25, wherein the reserve price is determined based on an impression score for at least one of the candidate content item providers, each impression score specifying, for a candidate content item provider, a measure of quality of the impression to the candidate content item provider.

32. The computer-readable medium of claim 31, wherein each impression score is based on one or more characteristics associated with the content item request data, the one or more characteristics including a predicted click-through rate.

33. The computer-readable medium of claim 25, wherein the reservation data further specifies, for each of the one or more reservation content item providers, a portion of the impression reservations that have been reserved for the reservation content item provider.

34. The computer-readable medium of claim 33, wherein identifying one or more candidate content item providers comprises identifying a reservation content item provider that has at least one unfulfilled impression reservation.

35. The computer-readable medium of claim 25, wherein the reserve price is generated based on a function of the expected revenue and a probability of selection.

36. The computer-readable medium of claim 25, wherein the content item to be provided in response to receiving the content item request data is an advertisement.

* * * * *